Patented July 19, 1932

1,868,376

UNITED STATES PATENT OFFICE

HEINRICH BERTSCH, OF CHEMNITZ, GERMANY, ASSIGNOR TO H. TH. BOHME AKTIEN-GESELLSCHAFT, OF CHEMNITZ, GERMANY, A CORPORATION OF GERMANY

TEXTILE TREATMENT LIQUID

No Drawing. Application filed August 20, 1928, Serial No. 300,957, and in Germany September 20, 1927.

It is known that the wetting powers of aqueous liquids are considerably enhanced by the addition of small quantities of an organic sulpho-acid, especially such sulpho-acids (the naphthaline series for example) as are substituted in the nucleus by one or more groups having three, or more than three, hydrocarbon atoms. Thus for example a comparatively small addition of dipropyl-naphthaline sulphonic acid imparts very high wetting powers to an aqueous liquid. The effect does not obtain in alkaline liquids, for instance in mercerization liquors. The strong soda lye salts out the sodium salt of the sulpho-acids immediately and no increase in the wetting powers of the lye occurs. To an expert it will come as a surprise that, as has now been found, phenols, which are well known to be soluble in soda lye, also have the capacity of maintaining the sodium salts of the sulpho-acids referred to in solution in the lye so that the latter are in a position to develop their full superficially active effect. A mixture of an organic sulpho-acid, a phenol and a sulphonated oil has been found to be particularly efficaceous. Preferably tri-cresol is employed. This mixture imparts to the lye wetting powers which are far superior to the known values. The sulphonated oil employed is preferably obtained by sulphonating ricinoleic fatty acid with sulphuric acid in excess and at low temperatures and, if desired, in the presence of anhydrous organic acids, acid anhydrides or chlorides.

Oils treated in this manner are intensely sulphonated since they contain more sulphonic groups to the molecule than oils sulphonated by ordinary methods.

*Example.*—300 kgs. of ricinoleic fatty acid are sulphonated with 300 kgs. of concentrated sulphuric acid at 0° in the normal manner and the sulphonation product is neutralized after the excess sulphuric acid has been washed out. 30 kgs. of the oil obtained in this fashion are mixed with 10 kgs. of dipropyl-naphthaline sulphonic acid and 60 kgs. of tri-cresol are worked into said mixture. The resultant product is clearly soluble in soda lye of 30° Bé. and imparts increased wetting powers thereto.

I claim:
1. A liquid treatment bath for use in treating fibrous materials comprising, in combination, a body of alkali metal hydroxide solution containing an aromatic sulphonic acid as a wetting agent and a phenol as an agent for maintaining said wetting agent in solution.
2. A wetting agent for use in treating fibrous materials with alkali metal hydroxides comprising, in combination, an aromatic sulphonic acid, a phenol, and an intensely sulphonated oil.
3. A liquid treatment bath for use in treating fibrous materials comprising, in combination, a body of alkali metal hydroxide solution containing dipropyl-naphthalene sulphonic acid as a wetting agent and a phenol as an agent for maintaining said wetting agent in solution.
4. A wetting agent for use in treating fibrous materials with alkali metal hydroxides comprising, in combination, dipropyl-napthalene sulphonic acid, a phenol, and an intensely sulphonated oil.
5. A wetting agent for use in treating fibrous materials with alkali metal hydroxides comprising, in combination, dipropyl-napthalene sulphonic acid, tri-cresol, and an intensely sulphonated oil.

Dr. HEINRICH BERTSCH.